United States Patent [19]

Idelson

[11] 4,265,811

[45] May 5, 1981

[54] NOVEL AZO DYES

[75] Inventor: Elbert M. Idelson, West Newton, Mass.

[73] Assignee: Polaroid Corporation, Cambridge, Mass.

[21] Appl. No.: 1,448

[22] Filed: Jan. 8, 1979

[51] Int. Cl.³ .................. C09B 45/26; C09B 45/16
[52] U.S. Cl. ................. 260/147; 260/145 A; 260/145 B; 260/149; 260/150; 260/151
[58] Field of Search ............ 260/147, 149, 150, 151, 260/145 A, 145 B

[56] References Cited

U.S. PATENT DOCUMENTS

| | | | |
|---|---|---|---|
| 3,252,963 | 5/1966 | Blackhall et al. | 260/147 |
| 3,878,158 | 4/1975 | Brouard et al. | 260/147 |
| 3,879,336 | 4/1975 | Maeda et al. | 260/147 |
| 3,987,023 | 10/1976 | McCrae et al. | 260/149 |
| 4,033,942 | 7/1977 | Beffa et al. | 260/145 A |
| 4,045,423 | 8/1977 | Brouard et al. | 260/147 |
| 4,123,429 | 10/1978 | Brouard et al. | 260/150 |
| 4,204,879 | 5/1980 | Paskins et al. | 260/149 |

OTHER PUBLICATIONS

Martell et al., Chemistry of the Metal Chelate Compounds; Prentice-Hall, N. Y. 1956, pp. 535, 549, 551.

*Primary Examiner*—Arthur P. Demers
*Attorney, Agent, or Firm*—Gaetano D. Maccarone

[57] ABSTRACT

There are described novel compounds which are chrome-complexed dyes and which include an ortho, ortho' dihydroxyazo dye moiety, an onium salt and a ligand which is a radical of an iminodiacetic acid.

8 Claims, No Drawings

NOVEL AZO DYES

BACKGROUND OF THE INVENTION

This invention is related to novel compounds and more particularly to compounds which are useful as dyes.

It is therefore the object of the invention to provide novel compounds.

It is another object of the invention to provide compounds which are useful as dyes.

It is a further object to provide compounds which include a ligand which is a radical of an iminodiacetic acid.

BRIEF SUMMARY OF THE INVENTION

These and other objects and advantages are accomplished in accordance with the invention by providing novel compounds which are chrome-complexed dyes and which include an ortho, ortho' dihydroxyazo dye moiety, an onium salt and a colorless ligand which is a radical of an iminodiacetic acid. Since the chromium complexes of ortho, ortho' dihydroxyazo dyes and iminodiacetic acids bear a single negative charge, a positive counterion is required in order to provide electrical neutrality. The novel compounds are represented by the structural formula:

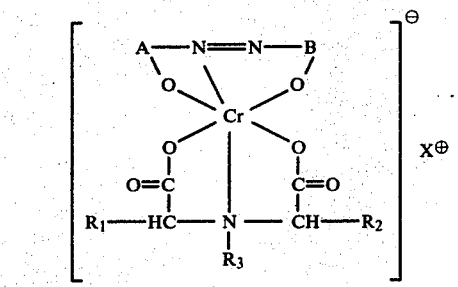
(I)

wherein

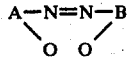

is the radical of an ortho, ortho' dihydroxy azo dye represented by the structural formula:

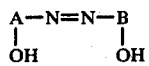

wherein A is an aromatic radical, for example, a radical of benzene or naphthalene; B is an aromatic or a nitrogen-containing heterocyclic radical, for example, a radical of benzene, napathalene, pyrazolone or pyrimidine; X is a cation; $R_1$ and $R_2$ may be H or when taken together may represent the carbon atoms necessary to complete, with the nitrogen atom of the ligand, a five or six member heterocyclic moiety; and $R_3$ may be H or alkyl having from 1 to 6 carbon atoms.

The positive counterion, X, may be any of many suitable counterions. Typical suitable positive counterions include, for example, metals such as barium, lithium or sodium or $H_3O^+$; or an onium salt such as an ammonium, phosphonium or sulfonium salt. A preferred class of onium salts which may be used is represented by the formula $N^+R_4R_5R_6R_7$ wherein $R_4$, $R_5$, $R_6$ and $R_7$ may be H or alkyl having from 1 to 8 carbon atoms. Other onium salts which may be used include the ammonium or quaternary salts of heterocyclic bases, e.g., pyridinium or alkyl picolinium or of aromatic amines, for example, aniline.

As noted, the ligand is a radical of an iminodiacetic acid which is represented by the structural formula:

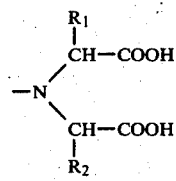

wherein $R_1$ and $R_2$ may be H or when taken together may represent the carbon atoms necessary to complete, with the nitrogen atom of the ligand, a five or six member heterocyclic moiety. A preferred ligand of the latter type is a radical of an iminodiacetic acid which is represented by the structural formula:

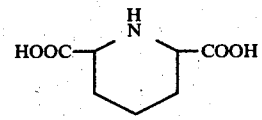

DESCRIPTION OF THE PREFERRED EMBODIMENTS

Specific dyes which are within the scope of the present invention are represented by the following structural formulas:

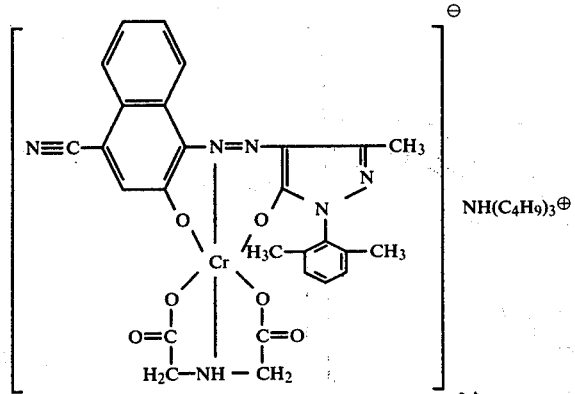
(II)

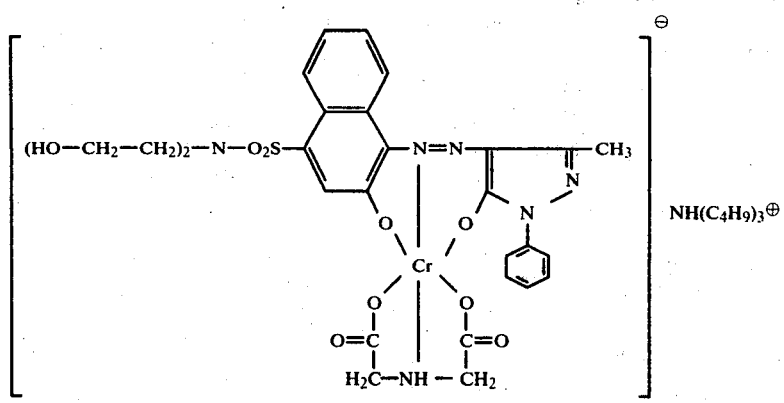
(III)
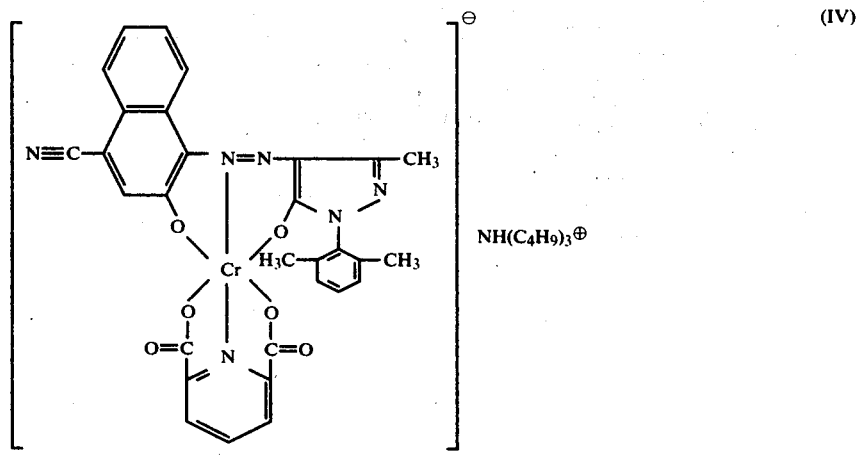
(IV)
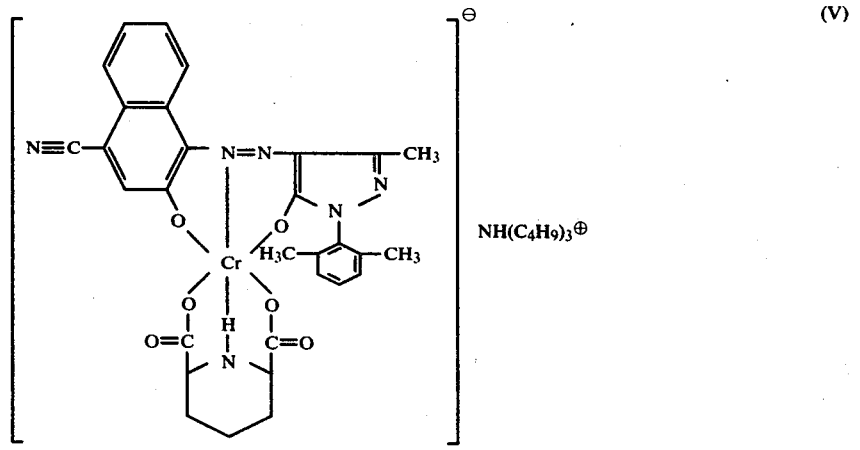
(V)
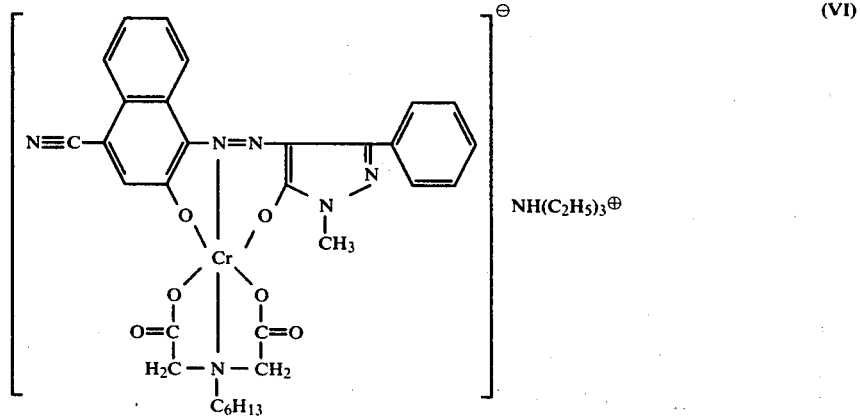
(VI)

-continued

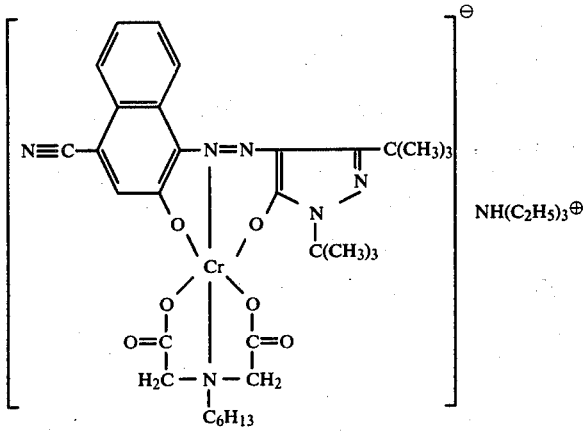

(VII)

The dye compounds of the invention are soluble in water and many organic solvents such as, for example, methyl cellosolve, dimethylformamide, ethanol, etc. The dyes may be applied to any object such as fabrics and the like by dissolving the dye in a suitable solvent and applying the solution to the material by any of many known techniques.

The invention will now be described in detail with respect to specific preferred embodiments by way of Examples it being understood that these are intended to be illustrative only, and the invention is not limited to the materials, process parameters, conditions, etc. which are recited therein.

EXAMPLE I

Preparation of Compound II

To 50 ml of acetic acid there were added 15 g (0.087 mole) of

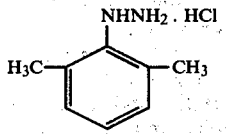

and 8.2 g (0.1 mole) of NaOCOCH$_3$ and the solution heated with stirring for 15 minutes at 60°–65° C. To the solution were added 11.8 g (0.09 mole) of ethyl acetoacetate and heating was continued for an hour. The mixture was filtered and the acetic acid removed by evaporation in a rotary evaporator. Ether was added to the residue giving 14.5 g of yellow solid, m.p. 186°–190° C. The solid was dissolved in chloroform and precipitated with hexane to give 10.75 g of solid, m.p. 186°–190° C.

$C_{12}H_{14}N_2O_2$ requires 71.26% C, 6.98% H and 13.85% N. Elemental analysis found 71.05% C, 7.09% H and 13.64% N.

1.95 g (0.01 mole) of 4-cyanonaphthalene-1-diazo-2-oxide, 2.02 g (0.01 mole) of the previous product and 2.12 g (0.02 mole) of sodium carbonate were combined in 25 ml of water and acetone was added to form a solution. After stirring at room temperature for two hours, 10% hydrochloric acid was added to precipitate the dye product. The dye was heated in methyl cellosolve at 90° C. with stirring and methanol was added while the solution was hot. Upon cooling 2.8 g of the dye were obtained.

$C_{23}H_{19}N_5O_2$ requires 69.33% C, 5.06% H and 17.58% N. Elemental analysis found 69.48% C, 5.03% H and 17.64% N.

Vis (meth. cell) γ max 510 nm (ε=30,800), 540 nm (ε=20,800)

2.0 g of the previous product were dissolved at room temperature in 20 ml of methyl cellosolve. To the mixture was added 2.66 g (0.01 mole) of chromium trichloride hexahydrate and the mixture heated overnight on a steam bath. The chrome complex product was obtained by precipitating on ice and water, filtering and washing with water.

Vis (meth. cell) γ max 537 nm (ε=19,000) 570 nm (ε=15,600 )

350 mg (0.7 m mole) of the chrome complex and 120 mg (0.885 m mole) of iminodiacetic acid were combined in 20 ml of methyl cellosolve and 5 ml of water. The mixture was heated on a steam bath and tri-n-butylamine was added to make the solution basic. The reaction mixture was heated for one hour and then precipitated into pH$^4$ buffer solution (potassium acid phthalate). The product was collected by filtration and washed with water.

$C_{39}H_{50}N_7O_6Cr$ requires 59.83% C, 6.69% H, 12.52% N and 6.64% Cr. Elemental analysis found 59.92% C, 6.60% H, 12.54% N and 6.56% Cr.

Vis (meth. cell) γ max 532 nm (ε=25,600), 572 nm (ε=31,000)

EXAMPLE II

Preparation of Compound III 0.29 g (5×10$^{-4}$ mole) of a compound having the structure

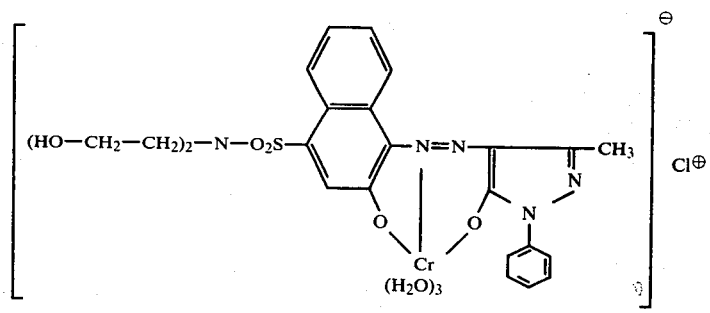

(prepared as described in Example 1 of U.S. Pat. No. 3,970,616) and 0.1 g ($7.5 \times 10^{-4}$ mole) of iminodiacetic acid were combined with excess tri-n-butylamine in methyl cellosolve and heated for two hours on a steam bath. The solution was cooled and precipitated into pH 4 buffer solution and the solid collected by filtration.

Vis (meth. cell) $\gamma$ max 566 nm ($\epsilon = 24,400$) 530 nm ($\epsilon = 23,200$)

EXAMPLE III

Preparation of Compound IV 0.25 g ($5 \times 10^{-4}$ mole) of the chromium complex described in Example I was dissolved in methyl cellosolve and 0.1 g ($6 \times 10^{-4}$ mole) of pyridine-2,6-dicarboxylic acid was added to the solution followed by an excess of tri-n-butylamine. The solution was warmed for a half-hour on a steam bath, cooled and then added to water. The product was collected by filtration, yielding 0.28 g on drying.

Vis (meth. cell) $\gamma$ max 577 nm ($\epsilon = 25,000$) 540 nm ($\epsilon = 23,600$)

EXAMPLE IV

Preparation of Compound V 0.25 g ($5 \times 10^{-4}$ mole) of the chromium complex described in Example I, 0.1 g ($5.85 \times 10^{-4}$ mole) of piperidine-2,6-dicarboxylic acid and excess tri-n-butylamine were combined in methyl cellosolve and heated for a half-hour on a steam bath. The product was isolated by precipitation into water and filtration to yield 0.28 g on drying.

Vis (meth. cell) $\gamma$ max 575 nm ($\epsilon = 29,200$) 535 nm ($\epsilon 23,800$)

EXAMPLE V

Preparation of Compound VI

Methyl hydrazine (4.6 g, 0.1 mole) was added dropwise to a 0° C. solution of ethyl benzoylacetate (19.2 g, 0.1 mole) in 100 ml of 2-propanol. The solution was warmed slowly to 50° C. for 12 hours. Then 400 ml of ether were added to the cooled solution and the solid was collected by filtration to yield, on drying, 13 g of product, m.p. 210.°–211° C.

The previous product (2 g, $1.1 \times 10^{-2}$ mole) was combined with 2.26 g ($0.1 \times 10^{-2}$ mole) of 4-cyano-1-diazo-2 naphthol and 5.0 g of sodium carbonate in a mixture of 50 ml of acetone and 10 ml of water and stirred at ambient temperature for one hour. The solution was quenched in cold dilute hydrochloric acid and the solid was collected by filtration. Recrystallization from 2-propanol yielded 2.5 g of product.

Vis (meth. cell) $\gamma$ max 492 nm ($\epsilon = 21,600$)

The previous product (2.5 g, $6.8 \times 10^{-3}$ mole) and chromium trichloride hexahydrate (5.4 g, $2 \times 10^{-2}$ mole) were combined in 2-methoxyethanol (30 ml) and heated to 90° C. for 12 hours. The solution was cooled, added to saturated salt solution and the solid collected by filtration. The solid was rinsed with water and air dried to yield 3.4 g of the chromium complex.

Hexylamine (10.1 g, 0.1 mole), chloroacetic acid (18.9 g, 0.2 mole) and barium hydroxide octahydrate 63.14 g, (0.2 mole) were stirred in 200 ml of water at 50° C. for 12 hours. The solid product was filtered, rinsed well with water and methanol and dried in vacuo to yield 30.4 g of the white powdery barium salt. The salt was then slurried in 500 ml of water at 90° C. and to the slurry there was added 5N sulfuric acid (32 ml) dropwise over a half-hour period. The slurry was filtered and the filtrate concentrated to a dense semi-solid. Treatment with acetone caused crystallization and the white solid was dried *in vacuo* to give 12.15 g of N-hexyliminodiacetic acid, m.p. 130°–131° C.

The chromium complex (1 g, $1.9 \times 10^{-3}$ mole) and the N-hexyliminodiacetic acid (1.4 g, $5 \times 10^{-3}$ mole) were combined with 20 ml of 2-methoxyethanol, 2 ml of water and triethylamine (1 g, $1 \times 10^{-2}$ mole) and warmed to 90° C. for a half-hour under an inert atmosphere. The solution was cooled, diluted with 100 ml of water and acidified with dilute hydrochloric acid. The solid dye was collected by filtration to yield 1.18 g.

Vis (meth. cell) $\gamma$ max 580 nm ($\epsilon = 23,400$), 542 nm (68 = 20,400)

Although the invention has been described in detail with respect to various preferred embodiments thereof, these are intended to be illustrative only and the invention is not limited thereto but rather those skilled in the art will recognize that modifications and variations may be made therein which are within the spirit of the invention and the scope of the appended claims.

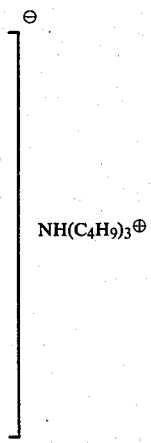

7. A compound as defined in claim 1 which is represented by the structural formula:
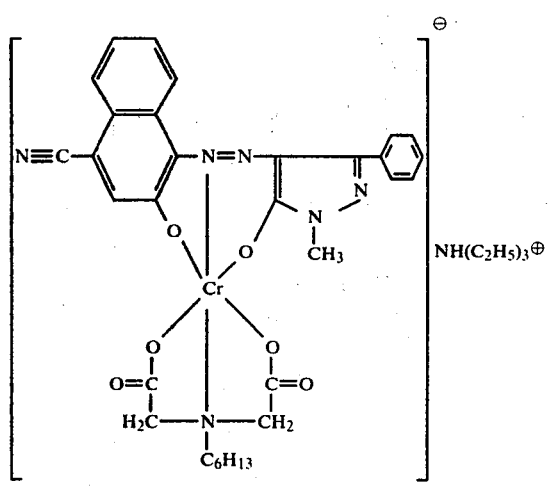
8. A compound as defined in claim 1 wherein $X^{\oplus}$ is represented by the formula
$$N^{\oplus}R_4R_5R_6R_7$$
wherein $R_4$, $R_5$, $R_6$ and $R_7$ each may be H or alkyl having from 1 to 8 carbon atoms.
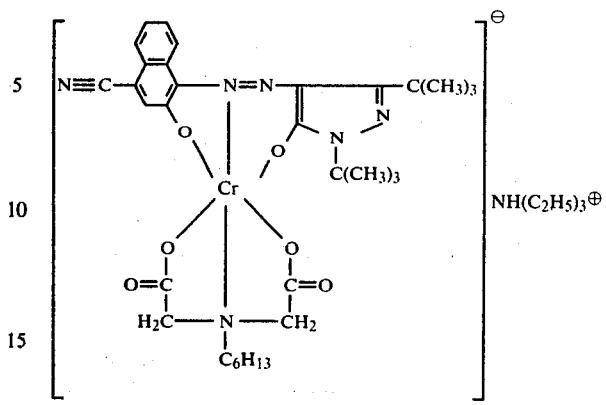

What is claimed is:

1. A compound which is represented by the structural formula:

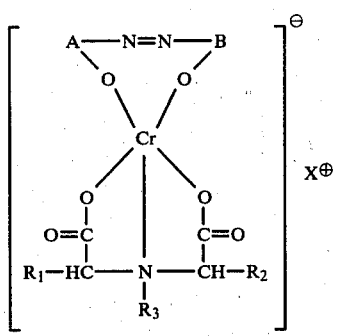

wherein A is a radical of benzene or naphthalene, B is a radical of benzene or naphthalene or a nitrogen containing heterocyclic radical, X is a cation, $R_1$ and $R_2$ may be H or when taken together may represent the carbon atoms necessary to complete a five or six member heterocyclic moiety and $R_3$ may be H or alkyl having from 1 to 6 carbon atoms.

2. A compound as defined in claim 1 which is represented by the structural formula:

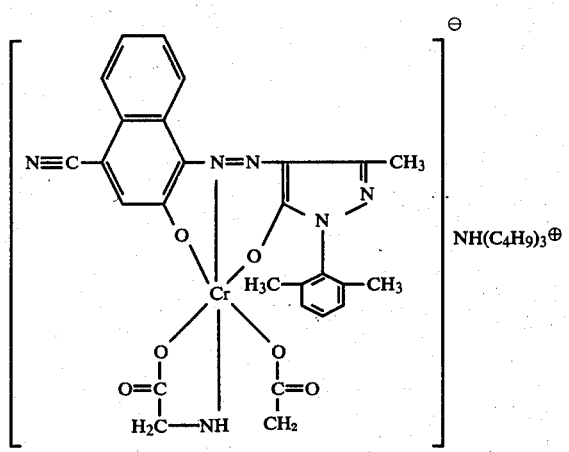

3. A compound as defined in claim 1 which is represented by the structural formula:

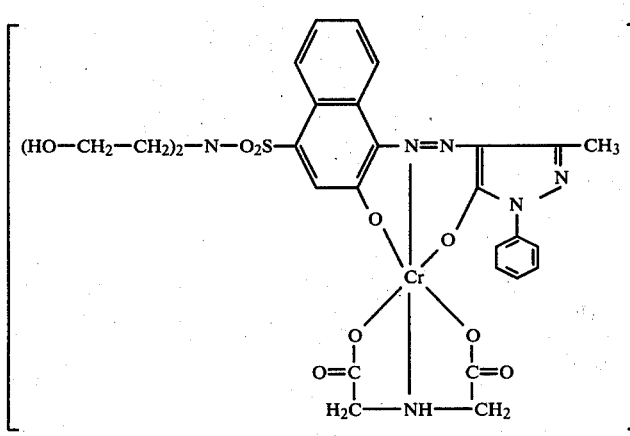

4. A compound as defined in claim 1 which is represented by the structural formula:

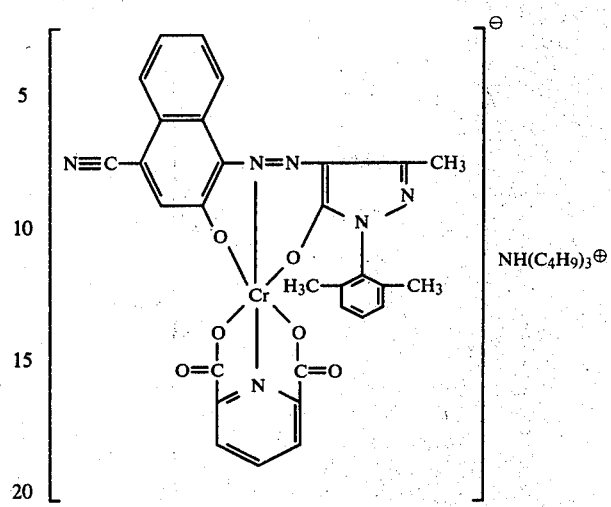

5. A compound as defined in claim 1 which is represented by the structural formula:

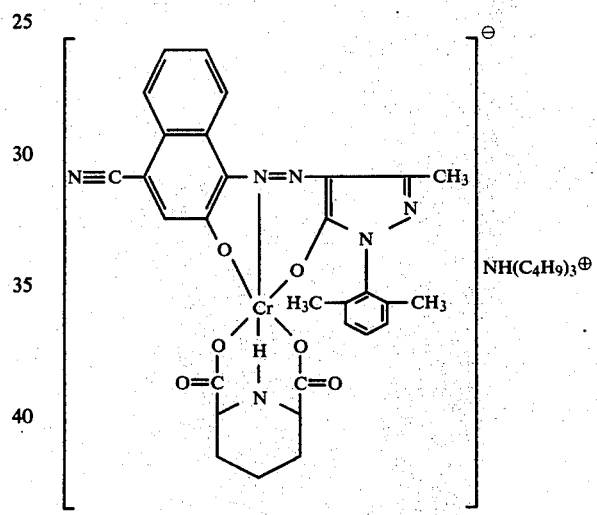

6. A compound as defined in claim 1 which is represented by the structural formula: